US006924638B2

(12) United States Patent
Muramatsu et al.

(10) Patent No.: US 6,924,638 B2
(45) Date of Patent: Aug. 2, 2005

(54) ARRANGEMENT FOR MOUNTING ROTATION SPEED SENSOR TO WHEEL BEARING ASSEMBLY

(75) Inventors: Makoto Muramatsu, Shizuoka (JP); Takayuki Norimatsu, Shizuoka (JP)

(73) Assignee: NTN Corporation, Osaka (JP)

( * ) Notice: Subject to any disclaimer, the term of this patent is extended or adjusted under 35 U.S.C. 154(b) by 39 days.

(21) Appl. No.: 10/637,591

(22) Filed: Aug. 11, 2003

(65) Prior Publication Data

US 2004/0108849 A1 Jun. 10, 2004

(30) Foreign Application Priority Data

Aug. 12, 2002 (JP) ....................................... 2002-234734

(51) Int. Cl.[7] ............................... G01P 3/48; G01P 3/54

(52) U.S. Cl. ....................................... 324/174; 384/448

(58) Field of Search ................................ 324/174, 173, 324/160, 207.11, 207.25, 207.2, 207.21, 207.24, 163, 166, 179, 178; 384/448; 267/53; D8/348, 395, 349; 248/73, 74.2, 674, 231.8, 231.71

(56) References Cited

U.S. PATENT DOCUMENTS 3,131,447 A * 5/1964 Tinnerman ............. 248/231.81
3,536,281 A * 10/1970 Attore et al. ................. 248/73
4,960,333 A 10/1990 Faye et al.
5,011,303 A 4/1991 Caron
5,080,500 A * 1/1992 Hilby et al. ................ 384/448
5,209,701 A 5/1993 Ishikawa et al.
5,264,790 A * 11/1993 Moretti et al. .............. 324/174
5,451,869 A * 9/1995 Alff ........................... 324/173
5,622,437 A * 4/1997 Alff ........................... 384/448
5,873,658 A * 2/1999 Message et al. ............ 384/448
5,902,065 A * 5/1999 Forestiero et al. .......... 403/327
5,927,867 A 7/1999 Niebling et al.
5,975,761 A * 11/1999 Ouchi et al. ................ 384/448
6,176,622 B1 * 1/2001 Nicot ......................... 384/448
6,216,321 B1 * 4/2001 Bakker et al. ................ 24/459
6,216,987 B1 * 4/2001 Fukuo ....................... 248/74.2
6,217,220 B1 4/2001 Ohkuma et al.
6,232,772 B1 * 5/2001 Liatard et al. ......... 324/207.25
6,367,744 B1 * 4/2002 Ebersole ...................... 248/58
6,605,938 B1 * 8/2003 Sentoku et al. ............. 324/174

FOREIGN PATENT DOCUMENTS

| | | |
|---|---|---|
| EP | 0 596 873 | 5/1994 |
| JP | 6-308145 | 11/1994 |
| JP | 9-263221 | 10/1997 |
| JP | 2000-221203 | 8/2000 |

* cited by examiner

*Primary Examiner*—Jay Patidar
*Assistant Examiner*—Kenneth J Whittington
(74) *Attorney, Agent, or Firm*—Wenderoth, Lind & Ponack, L.L.P.

(57) ABSTRACT

A rotation speed sensor can be detachably mounted to an outer member of a wheel bearing assembly. A sensor holder is a leaf spring folded in two and has upper and lower portions having windows aligned with each other and a downwardly protruding rib and an upwardly protruding rib, respectively, and a connecting portion. The sensor is inserted through these windows until a rib formed on the connecting portion engages in a groove formed in the back of the sensor. The holder is mounted on the outer member until the downwardly protruding rib and upwardly protruding rib engage in grooves formed in a ledge axially protruding from one end of the outer ring and the sensor is received in a cutout formed in the ledge. In this state, the holder is strained, thereby elastically holding the sensor in the cutout formed in the ledge.

3 Claims, 4 Drawing Sheets

ARRANGEMENT FOR MOUNTING ROTATION SPEED SENSOR TO WHEEL BEARING ASSEMBLY

BACKGROUND OF THE INVENTION

This invention relates to an arrangement for mounting a rotation speed sensor to a wheel bearing assembly.

There is known a wheel bearing assembly carrying a wheel speed sensor assembly for detecting the wheel speed for use with e.g. an antilock brake system. Such a wheel speed sensor assembly comprises a magnetic ring mounted on a rotary member that rotates together with a vehicle wheel, and adapted to produce circumferentially alternating magnetic fields when it rotates, and a rotation speed sensor mounted on a stationary member fixed to the vehicle body for sensing the alternating magnetic fields produced by the magnetic ring and producing a wheel speed signal corresponding to the alternating magnetic fields. Ordinarily, the abovementioned rotary member to which the magnetic ring is mounted, is an inner member (inner ring) of the wheel bearing assembly, while the stationary member to which the rotation sensor is mounted, is an outer member (outer ring) of the wheel bearing assembly.

The rotation sensor is mounted to the stationary member so as to oppose the magnetic ring. The rotation sensor has to be mounted as stably as possible So as not to shake. If the sensor fails, it has to be removed for repair or replacement. For this purpose, mounting and dismounting of the sensor should be as easy as possible. JP patent publications 6-308145, 9-263221 and 2000-221203 disclose wheel bearing assemblies carrying a rotation sensor which is snapped on a stationary member of the bearing assembly. Such a snap-on sensor can be easily mounted to and dismounted from the stationary member.

In any of these publications, the rotation sensor is mounted to the stationary member (ring) through an annular support member. That is, the support member is directly mounted to the stationary member, and a case of the rotation sensor is snapped on in the support member by elastically deforming the case. In JP publication 6-308145, the annular support member, too, is snapped on the stationary member so as to be dismounted from the stationary member. In the other two publications, the support member is fixed to the stationary member, so that only the wheel speed sensor is dismountable.

In these conventional arrangements, the annular support member has a first mounting portion mounted to the stationary member and a second mounting portion coupled to the sensor. The sensor is thus mounted to the stationary member through the two discrete mourning portions of the support member. Thus, the sensor is likely to shake or loosen relative to the stationary member. Also, the two discrete mounting portions complicate and make bulky the support member, and also increase its cost. Also, a wide installation space is required.

An object of this invention is to provide an arrangement for mounting a rotation sensor on a wheel bearing assembly with which the rotation sensor can be easily, directly, stably and detachably mounted to the stationary member of the wheel bearing assembly.

SUMMARY OF THE INVENTION

According to the present invention, there is provided an arrangement for mounting a rotation speed sensor to a wheel bearing assembly comprising an outer member adapted to be fixed to a vehicle body and formed with two raceways on a radially inner surface thereof, an inner member mounted in the outer member and adapted to rotate together with a vehicle wheel, the inner member being formed with two raceways on a radially outer surface thereof so as to radially oppose the raceways formed on the outer member, and a plurality of rolling elements disposed between each of the two radially opposed pairs of raceways, the arrangement comprising a magnetic ring for producing circumferentially alternating magnetic fields when the magnetic ring rotates, the magnetic ring being mounted on the inner member so as to be coaxial with a rotation axis of the inner member, a rotation speed sensor mounted on one end of the outer member so as to oppose the magnetic ring for sensing the circumferentially alternating magnetic fields produced by the magnetic ring and detecting the rotation speed of the vehicle wheel, and a sensor holder formed of an elastic material, the sensor holder being detachably mounted to the outer member with the sensor held in the sensor holder, the sensor holder having an engaging portion at which the sensor holder engages the outer member and structured such that when the sensor holder is mounted to the outer member with the sensor held in the sensor holder, the sensor holder is elastically deformed, whereby the sensor is pressed against the outer member by the sensor holder under an elastic restoring force of the sensor holder.

The rotation speed sensor can thus be stably snapped on the stationary member, that is, the outer member.

Specifically, there is provided an arrangement wherein the outer member has, at one end, a circumferential groove or rib formed on a radially outer surface thereof and a circumferential rib or groove formed on a radially inner surface thereof, wherein the sensor holder is a leaf spring folded in two and comprising an upper portion, a lower portion and a connecting portion connecting the upper and lower portions together, the upper portion being formed with a hole or a cutout, and a rib or groove for engagement with the groove or rib formed on the radially outer surface of the outer member, the lower portion being formed with a hole or a cutout aligned with the hole or cutout formed in the upper portion, and a rib or groove for engagement with the groove or rib formed on the radially inner surface of the outer member, the rib and groove of the sensor holder being detachably in engagement with the respective circumferential groove and rib formed on the radially outer and inner surfaces of the outer member with the rotation speed sensor received in the holes or cutouts formed in the upper and lower portions of the sensor holder and pressed against the outer member by the connecting portion of the sensor holder under the elastic restoring force produced in the sensor holder, and wherein a protrusion is formed on one of the back of the sensor and the connecting portion so as to engage in a groove formed in the other of the back of the sensor and the connecting portion, thereby preventing the sensor slipping out of the sensor holder in a radial direction of the wheel bearing assembly.

Preferably, the outer member is formed with a ledge axially protruding from one end of the outer member, and the circumferential grooves or ribs are formed on the ledge, the ledge being further formed with a cutout to receive the rotation speed sensor therein with the rotation speed sensor pressed against a deep end of the cutout formed in the ledge by the connecting portion of the sensor holder.

In another embodiment, there is also provided an arrangement in which the sensor holder is a U-shaped wire spring comprising a crossbar portion and arm portions extending from both ends of the crossbar portion in the same direction, each of the arm portions comprising a first portion extending from the crossbar portion and a second portion extending from the end of the first portion, the first portions being bent obliquely relative to the second portions, the second portions each having a bent free end that is bent downwardly at a substantially right angle relative to the respective second portions, the outer member having holes formed near the one end, the bent free ends of the sensor holder being engaged in the holes with the rotation speed sensor held in the sensor holder and sandwiched between the crossbar portion of the sensor holder and the outer member, the sensor holder being elastically deformed when the bent free ends are engaged in the holes with the rotation speed sensor held in the sensor holder, whereby the rotation speed sensor is clamped against the outer member by the crossbar portion of the sensor holder under an elastic restoring force produced in the sensor holder, the rotation speed sensor being formed with a groove in back thereof to receive the crossbar portion of the sensor holder, thereby preventing the rotation speed sensor from getting out of the sensor holder in a radial direction.

The magnetic ring and the rotation speed sensor may oppose each other in an axial direction or a radial direction of the wheel bearing assembly.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
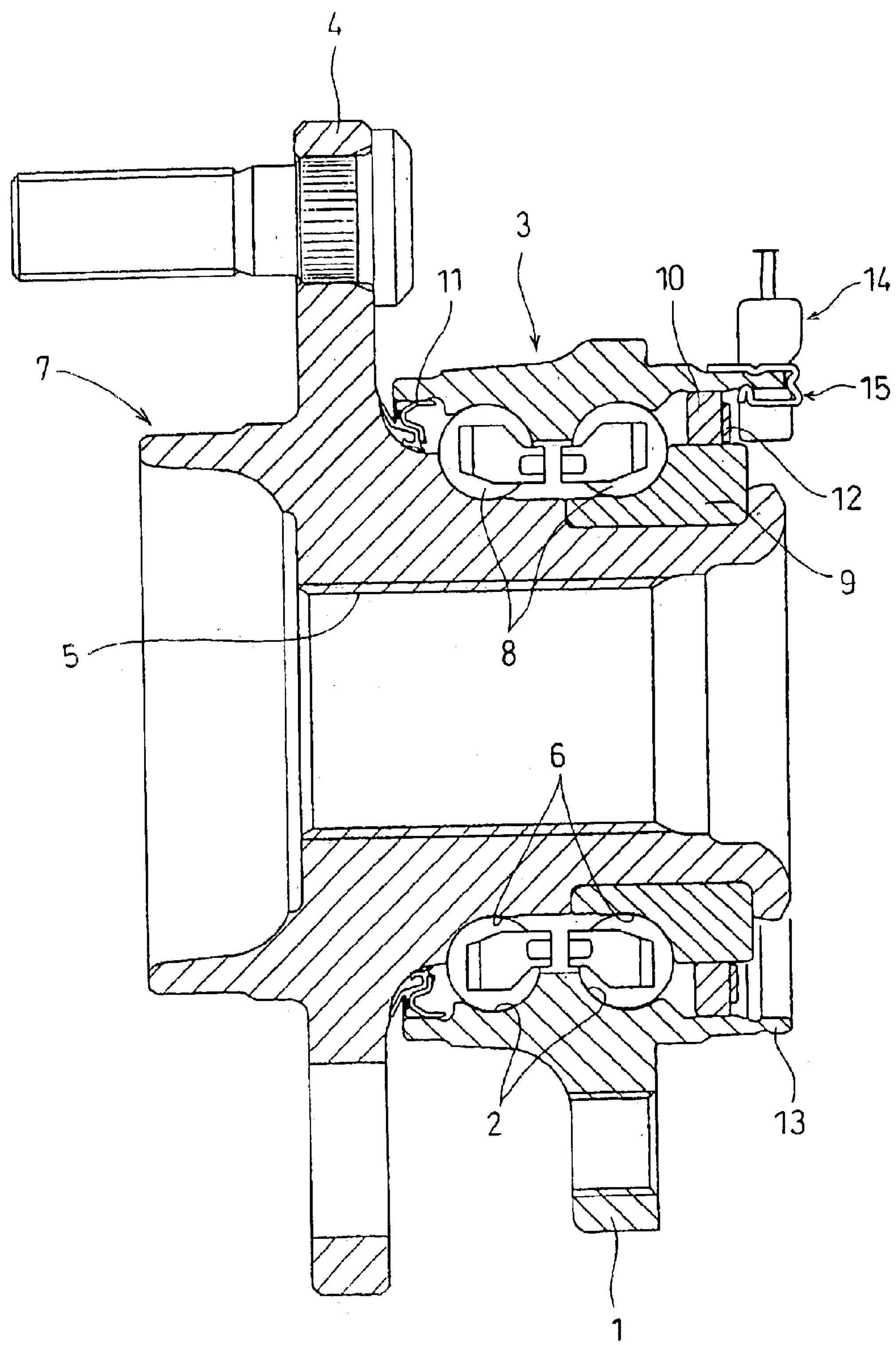
FIG. 1 is a vertical sectional view of a sensor mounting arrangement of a first embodiment.

The embodiments of the invention will be described with reference to FIGS. 1–5. FIGS. 1 and 2 show the first embodiment. The wheel bearing assembly of this embodiment includes an outer member 3 having a flange 1 to be secured to the vehicle body, and formed with two raceways 2 on its radially inner surface, and an inner member 7 having a wheel-mounting flange 4 and formed with a splined bore 5 in which a wheel-driving axle is adapted to engage. On the radially outer surface of the inner member 7, two raceways 6 are formed so as to radially oppose the raceways 2 of the outer member 3. Two rows of rolling elements 8 are disposed between the raceways 2 and 6. The inboard (right in FIG. 1) raceway 6 of the inner member 7 is formed on an inner ring 9 mounted on the inner member 7.

The annular bearing space defined between the inner and outer members, in which the rolling elements 8 are received, have their both ends sealed by seal members 10 and 11. A magnetic ring 12 adapted to produce circumferentially alternating magnetic fields when it rotates is mounted to the inboard side seal member 10. The outer member 3 has an annular ledge 13 axially protruding from its inboard end. A sensor holder 15 is snapped on the ledge 13 with a rotation speed sensor 14 held therein. The sensor 14 produces a wheel speed signal corresponding to alternating magnetic fields produced by the magnetic ring 12 as the latter rotates.

Figure 2A:
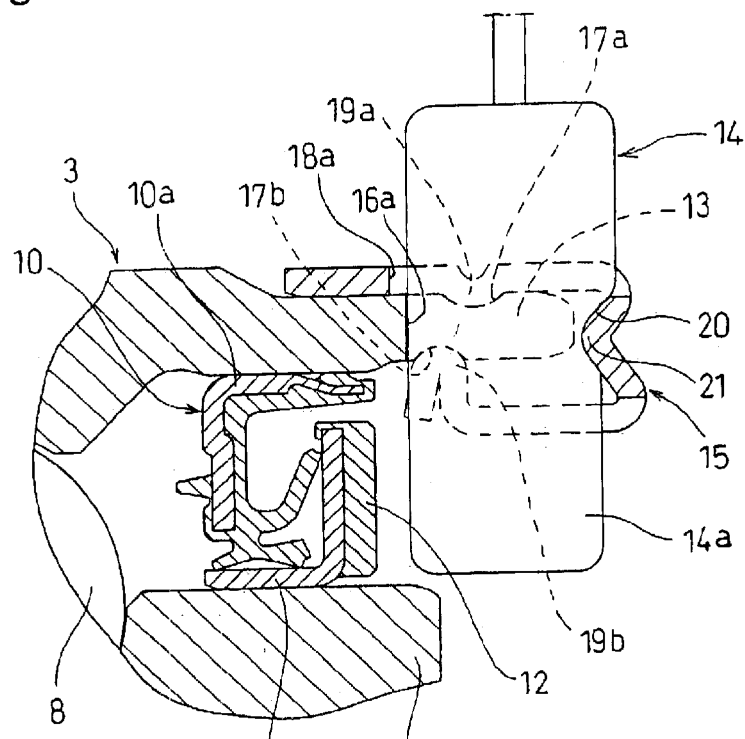
FIG. 2A is an enlarged vertical sectional view of the arrangement of FIG. 1.

As shown in FIG. 2A, the inboard seal member 10 comprises a seal ring 10*a* mounted to the outer member 3 and a slinger 10*b* mounted to the inner ring 9. The magnetic ring 12 is mounted to the slinger 10*b* so as to face axially.

Figure 2B:
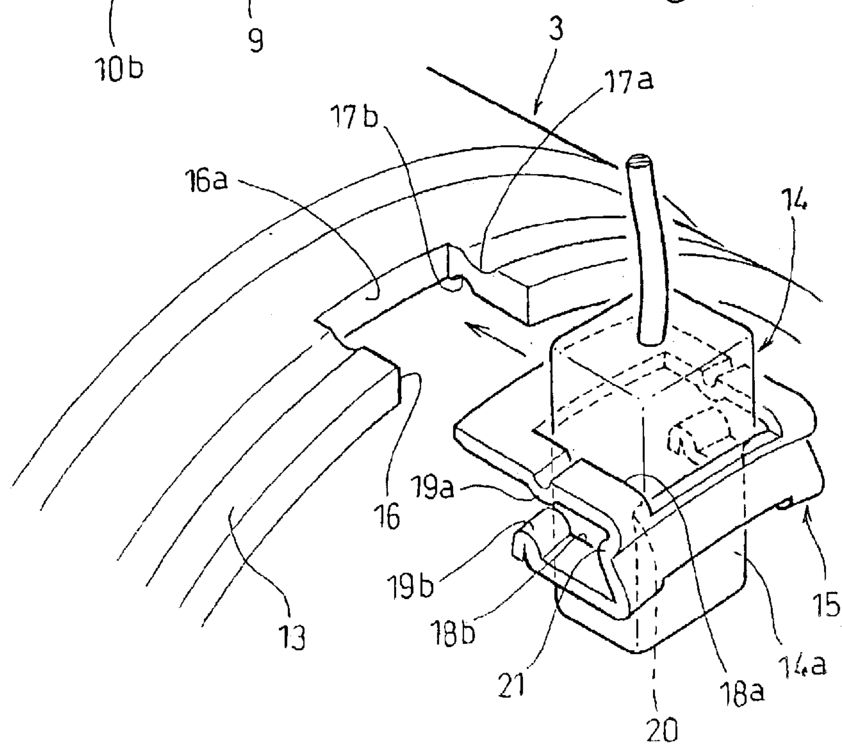
FIG. 2B is a partial perspective view of the arrangement of FIG. 1 showing how a sensor is mounted to an outer member of a wheel bearing assembly.

As shown in FIGS. 2A and 2B, the ledge 13 has circumferential grooves 17*a* and 17*b* formed in its radially outer and inner surfaces, respectively, and a cutout 16. The cutout 16 is of such a size that a case 14*a* of the sensor 14 can pass therethrough in a radial direction. The ledge 13 may not be annular provided the cutout 16 and the grooves 17*a* and 17*b* can be formed.

The sensor holder 15 is a leaf spring folded in two and comprising an upper portion formed with a through hole 18*a*, a lower portion formed with a cutout 18*b*, and a connecting portion connecting the upper and lower portions. The hole 18*a* and the cutout 18*b* are aligned with each other and of such a size that the case 14*a* of the sensor 14 can pass therethrough. The upper portion and lower portion of the sensor holder 15 are further formed with a downwardly protruding rib 19*a* and an upwardly protruding rib 19*b*, respectively, that are adapted to engage in the grooves 17*a* and 17*b* formed in the ledge 13, respectively. The ribs 19*a* and 19*b* are formed by pressing the upper and lower portions from above and below, respectively. The connecting portion of the holder 15 is formed with an inwardly protruding rib 21 adapted to engage in a recess formed in the back of the case 14*a* of the sensor 14. The rib 21 is formed by pressing.

In order to mount the sensor 14 on the ledge 13, as shown in FIG. 2B, the sensor case 14*a* is inserted through the through hole 18*a* and the cutout 18*b* of the sensor holder 15 until the rib 21 formed on the connecting portion of the holder 15 engages in the groove 20 formed in the back of the case 14*a*. With the case 14*a* held by the sensor holder 15 in this manner, the sensor holder 15 is inserted toward the ledge 13 in the axial direction of the bearing assembly until the ribs 19*a* and 19*b* engage in the grooves 17*a* and 17*b* of the ledge 13, respectively.

When the sensor holder 15 is not strained, the distance between the ribs 19*a* and 19*b* is shorter than the thickness of the ledge 13. Thus, when the sensor holder 15 is pushed into the cutout 16, its upper and lower portions are elastically spread open and the ribs 19*a* and 19*b* engage in the grooves 17*a* and 17*b*. The ribs 19*a* and 19*b* and the grooves 17*a* and 17*b* are positioned such that the front side of the sensor case 14*a* will contact the deep end face 16*a* of the cutout 16 before the ribs 19*a* and 19*b* engage in the grooves 17*a* and 17*b*. Thus, an elastic restoring force is produced in the entire sensor holder 15. The sensor case 14*a* is thus held against the end face 16*a* of the cutout 16 under the elastic restoring force produced in the sensor holder 15. In an alternative method of mounting the sensor case 14*a* to the ledge 13, the sensor holder 15 alone may be mounted on the ledge 13 and then the sensor case 14*a* may be pushed into the hole 18*a* and the cutout 18*b*.

Figure 3A:
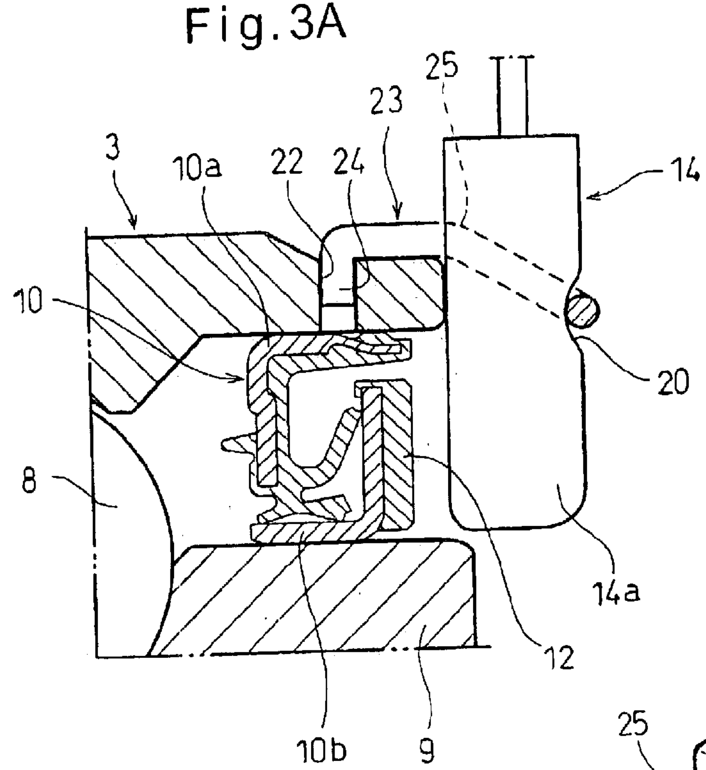
FIG. 3A is an enlarged vertical sectional view of a second embodiment.
Figure 3B:
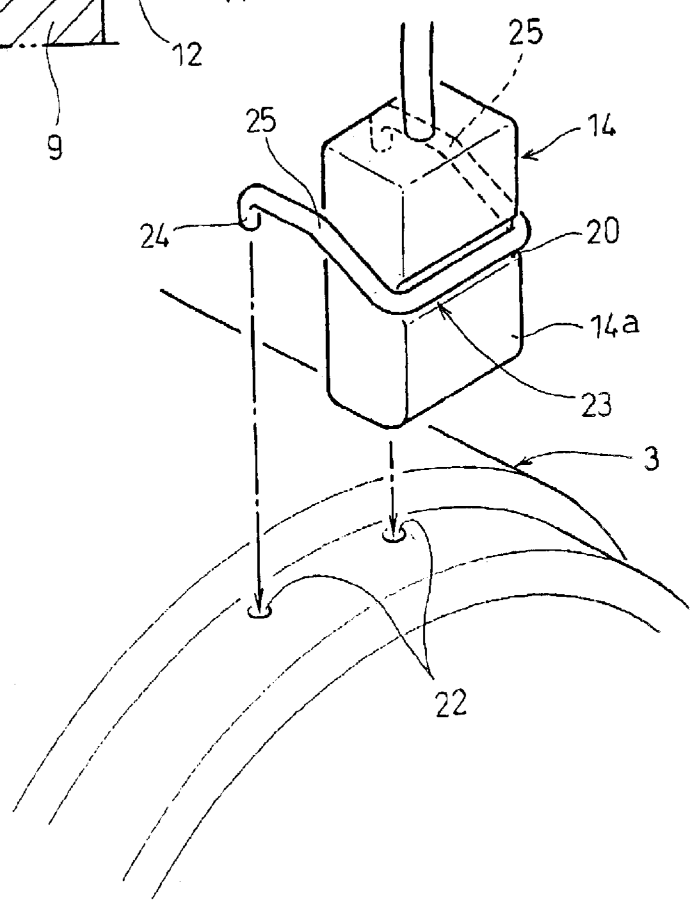
FIG. 3B is a partial perspective view of the second embodiment showing how a sensor is mounted to an outer member of a wheel bearing assembly.

FIGS. 3A and 3B show the second embodiment. Since the basic structure of the second embodiment is the same as the first embodiment, FIGS. 3A and 3B show only its sensor assembly. This embodiment differs from the first embodiment in that the outer member 3 has no ledge 13 and has two holes 22 near its inboard end, and that a sensor holder 23 for holding the case 14*a* of the sensor 14 is a U-shaped wire spring comprising a crossbar portion and arm portions extending from both ends of the crossbar portion in the same direction.

Each arm comprises a first portion 25 obliquely extending from the crossbar portion and a second portion extending straight from the first portion 25. The first portion is bent obliquely downwardly toward the crossbar portion as shown in FIG. 3A. But instead, the first portion 25 may be bent obliquely upward. Also, the portion 25 may be curved. The second portion of each arm has a bent free end 24 that is bent downwardly at a right angle.

In order to mount the rotation speed sensor 14 to the outer member 3 using this sensor holder 23, as shown in FIG. 3B, the sensor case 14*a* is held in the holder 23 with its crossbar portion engaged in the groove 20 formed in the back of the sensor case 14*a*, and then the sensor case 14*a* is moved toward the inboard end of the outer member 3 in a radial direction while sliding the front surface of the sensor case 14*a* along the inboard end face of the outer member until its bent ends 24 completely engage in the two holes 22.

While the portion 25 is inclined, the distance between its crossbar portion and the bent ends 24 is smaller than the sum of the thickness of the sensor case 14*a* and the distance between the inboard end face of the outer member 3 and the two holes 22. But, by deforming the portion 25 straight, the bent ends 24 can be put into the holes 22 with the sensor case 14*a* held in the holder 23 as shown in FIG. 3A. In this state, the holder 23 is strained, that is, an elastic restoring force is produced in the holder. Thus, the sensor case 14*a* is pressed against the inboard end face of the outer member 3 under the elastic restoring force produced in the holder 23. The sensor case 14*a* can be inserted in the holder after the bent ends 24 of the holder 23 are engaged in the holes 22.

Figure 4:
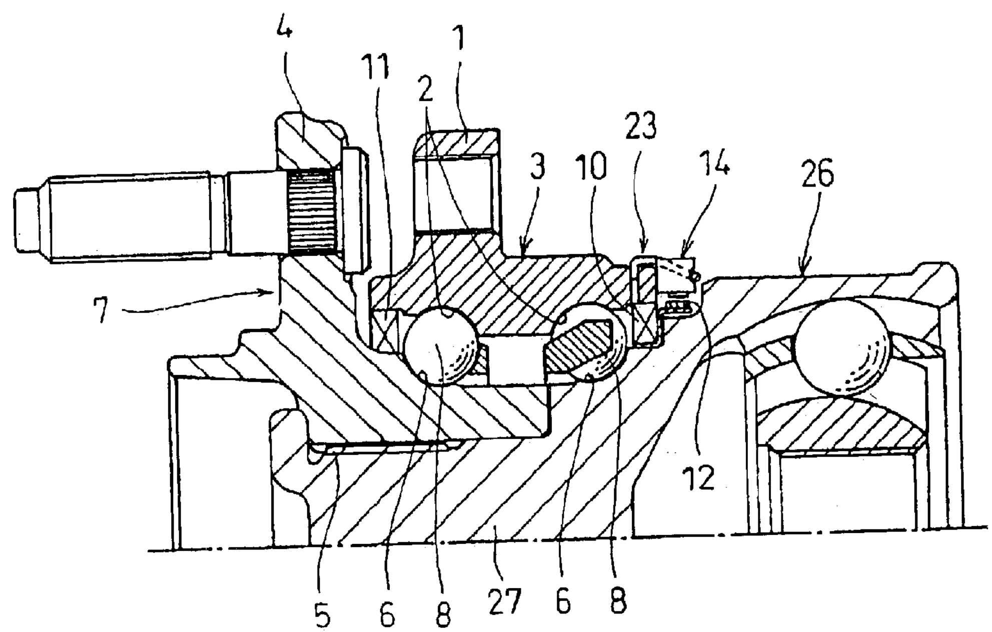
FIG. 4 is a vertical sectional view of a third embodiment.
Figure 5:
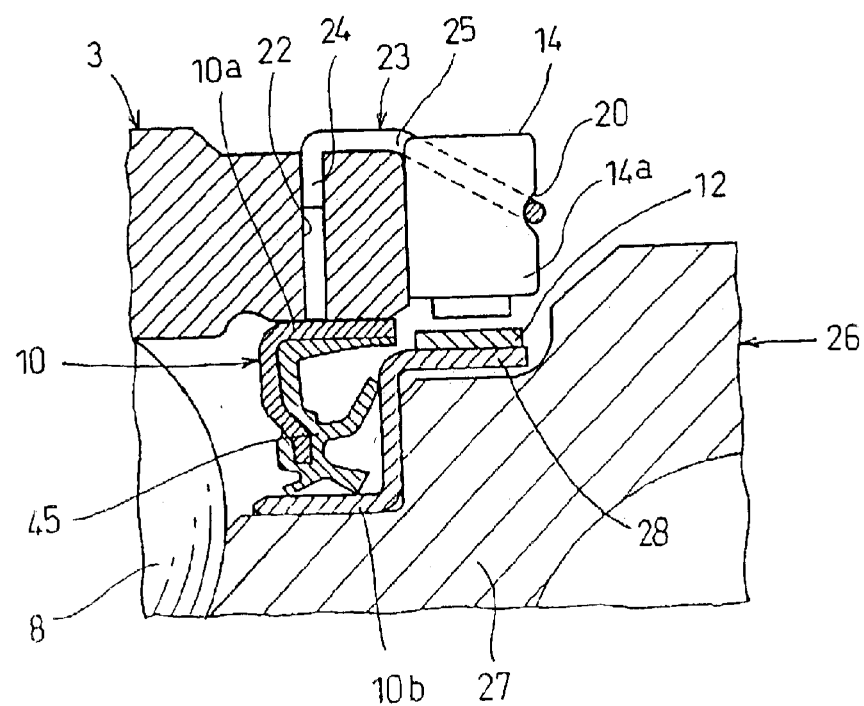
FIG. 5 is a partial enlarged vertical sectional view of the third embodiment.

The wheel bearing assembly of the third embodiment, shown in FIGS. 4 and 5, differs from the previous embodiments in that the inner ring 9 is omitted, and instead, the inboard raceway 6 is formed on the radially outer surface of an outer joint member 27 of a constant-velocity joint 26. The outer joint member 27 has a shaft portion that is inserted in and keyed to the splined hole 5 of the inner member 7. A magnetic ring 12 is mounted to the inboard seal member 10. The sensor 14 is mounted to the inboard end of the outer member 3 using the same sensor holder 23 as used in the second embodiment.

As shown in FIG. 5, the inboard seal member 10 comprises a seal ring 10*a* mounted to the outer member 3, and a slinger 10*b* mounted on the outer joint member 27 and having an axially protruding annular flange 28. The magnetic ring 12, which is tubular in shape, is mounted on the outer periphery of the flange 28 so as to face radially.

The rotation speed sensor 14 is mounted to the outer member 3 in the same manner as the sensor 14 of the second embodiment. The sensor 14 of this embodiment has a sensor probe embedded at the bottom end of the sensor case 14*a* so as to radially oppose the radially outer surface of the tubular magnetic ring 12.

The sensor holder according to the present invention is not limited to the two specific types shown in the embodiments but encompasses any variant which can press the wheel speed sensor against the outboard end of the outer member under an elastic restoring force produced therein when it is mounted to the outer ring.

Using the sensor holder according to the invention, a wheel speed sensor can be stably mounted to the outer member of a wheel bearing assembly. Still, the sensor can be easily mounted to and dismounted from the outer member for repair and replacement.

Since the sensor holder is elastically deformed only at one point thereof when it is snapped on the outer member, the sensor holder is simple in structure and compact.

What is claimed is:

1. An arrangement for mounting a rotation speed sensor to a wheel bearing assembly comprising an outer member adapted to be fixed to a vehicle body and formed with two raceways on a radially inner surface thereof, an inner member mounted in said outer member and adapted to rotate together with a vehicle wheel, said inner member being formed with two raceways on a radially outer surface thereof so as to radially oppose said raceways formed on said outer member, and a plurality of rolling elements disposed between each of the two radially opposed pairs of raceways, said arrangement comprising a magnetic ring for producing circumferentially alternating magnetic fields when said magnetic ring rotates, said magnetic ring being mounted on said inner member so as to be coaxial with a rotation axis of said inner member, a rotation speed sensor mounted on one end of said outer member so as to oppose said magnetic ring for sensing the circumferentially alternating magnetic fields produced by said magnetic ring and detecting the rotation speed of the vehicle wheel, and a sensor holder formed of an elastic material, said sensor holder being detachably mounted to said outer member with said sensor held in said sensor holder, said sensor holder having an engaging portion at which said sensor holder engages said outer member and structured such that when said sensor holder is mounted to said outer member with said sensor held in said sensor holder, said sensor holder is elastically deformed, whereby said sensor is pressed against said outer member by said sensor holder under an elastic restoring force of said sensor holder, wherein said outer member has, at said one end, a circumferential groove or rib formed on a radially outer surface thereof and a circumferential rib or groove formed on a radially inner surface thereof, wherein said sensor holder is a leaf spring folded in two and comprising an upper portion, a lower portion and a connecting portion connecting said upper and lower portions together, said upper portion being formed with a hole or a cutout, and a rib or groove for engagement with the groove or rib formed on the radially outer surface of said outer member, said lower portion being formed with a hole or a cutout aligned with the hole or cutout formed in said upper portion, and a rib or groove for engagement with the groove or rib formed on the radially inner surface of said outer member, said rib and groove of said sensor holder being detachably in engagement with said respective circumferential groove and rib formed on the radially outer and inner surfaces of said outer member with said rotation speed sensor received in said holes or cutouts formed in said upper and lower portions of said sensor holder and pressed against said outer member by said connecting portion of said sensor holder under the elastic restoring force produced in said sensor holder, and wherein a protrusion is formed on one of the back of said sensor and said connecting portion so as to engage in a groove formed in the other of the back of said sensor and said connecting portion, thereby preventing said sensor slipping out of said sensor holder in a radial direction of the wheel bearing assembly, wherein said outer member is formed with a ledge axially protruding from said one end of said outer member, said circumferential grooves or ribs are formed on said ledge, said ledge being further formed with a cutout to receive said rotation speed sensor therein with said rotation speed sensor pressed against a deep end of said cutout formed in said ledge by said connecting portion of said sensor holder.

2. The arrangement as claimed in claim 1 wherein said magnetic ring and said rotation speed sensor oppose each other in the direction of said rotation axis.

3. The arrangement as claimed in claim 1 wherein said magnetic ring and said rotation speed sensor oppose each other in a radial direction of the wheel bearing assembly.

* * * * *